United States Patent

[11] 3,590,172

| [72] | Inventor | Roy F. Dehn |
| | | Wickliffe, Ohio |
| [21] | Appl. No. | 836,814 |
| [22] | Filed | June 26, 1969 |
| [45] | Patented | June 29, 1971 |
| [73] | Assignee | McNeil Corporation |
| | | Akron, Ohio |

[54] ELECTRIC POWER DISTRIBUTION SYSTEM
1 Claim, 2 Drawing Figs.

[52] U.S. Cl. .................................................. 191/32
[51] Int. Cl. .................................................. B60m 1/30
[50] Field of Search.......................................... 104/2, 3, 5, 93, 139, 235, 245, 247, 138; 191/1—40; 238/281, 282, 341; 248/430; 214/95

[56] References Cited
UNITED STATES PATENTS

| 2,770,286 | 11/1956 | Weller | 248/430 |
| 2,815,136 | 12/1957 | Mayer | 214/95 |
| 2,904,197 | 9/1959 | Asheim et al. | 214/95 |
| 3,222,464 | 12/1965 | Dehn | 191/40 |
| 3,426,699 | 2/1969 | O'Donnell | 104/93 |

*Primary Examiner*—Arthur L. La Point
*Assistant Examiner*—T. Kenneth Silverman
*Attorney*—Watts, Hoffmann, Fisher and Heinke ABSTRACT: An electric power distribution system with a support for an I-shaped current conductor comprising spaced circumferentially grooved, molded, electrically nonconductive rollers adapted to receive oppositely projecting flanges of the conductor in the grooves thereof to movably support the conductor.

PATENTED JUN29 1971 3,590,172

INVENTOR.
ROY F. DEHN
BY Watts, Hoffmann,
Fisher & Heinke
ATTORNEYS.

3,590,172

ELECTRIC POWER DISTRIBUTION SYSTEM

SUMMARY OF INVENTION

This invention provides a novel and improved system for completing electric circuits between stationary and movable equipment including an elongated bar or rail-type current conductor having longitudinal flanges extending in opposite directions therefrom and a support assembly for the conductor comprising grooved rollers adapted to receive longitudinal flanges of the conductor and support the conductor for a lengthwise movement. The support assembly will also support a conductor in any position and/or a plurality of conductors in close side-by-side spacing.

Figure 1:
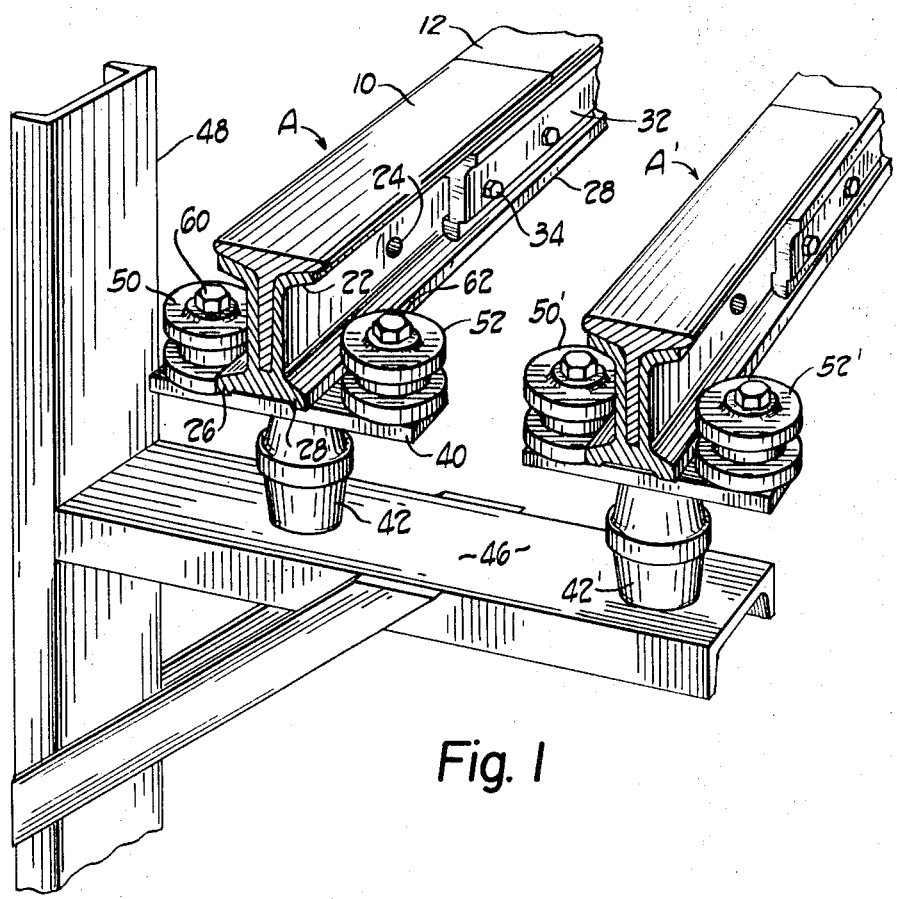
FIG. 1 is a fragmentary perspective view of the conductor portion of an electric power distribution system embodying the present invention.
Figure 2:
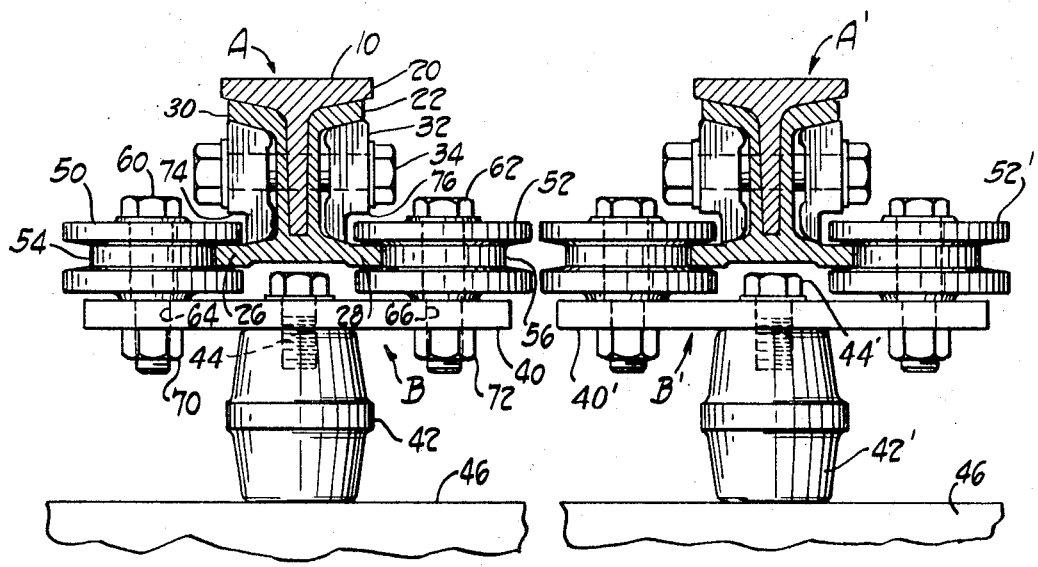
FIG. 2 is a front view of the equipment shown in FIG. 1.

The invention is susceptible of being embodied in electric systems of various construction and intended for various purposes, and it is to be understood that the preferred embodiment herein shown and described is merely illustrative of the invention and that the invention is not limited by the device shown but merely by the appended claims.

The reference characters A and A' designate two duplicate conductors of an electrical power distribution system for a personnel or material handling system such as an electrified railway, crane, or the like. The conductors A and A' are also supported at suitable intervals along their lengths by duplicate devices or assemblies, designated generally as B and B', respectively. Since the supporting devices for the conductors are duplicates of one another, merely the left-hand device B will be described in detail and the duplicate parts of the right-hand device, designated by the same reference characters with a prime mark affixed thereto.

The conductor A is made up of a plurality of duplicate conductor bars 10, 12, similar in construction to the conductor bars disclosed in my U.S. Pat. No. 3,325,606, issued June 13, 1967, connected together by splice plates similar to those disclosed in my aforementioned U.S. patent.

The conductor bars 10 and 12 are of composite construction, each formed of an elongated member 20 of high strength and good wearing qualities, for example, steel, having a cross-sectional shape generally similar to that of a T-beam and an elongated member 22 of relatively high electrical conductivity, for example, aluminum, having a cross-sectional shape generally similar to that of an I-beam and a medial longitudinal extending slot in the top side thereof into which is received the web or stem of the T-member 20 with the undersides of the flange portions of the member engaging the adjoining top sides of the I-shaped member 22. The two members 20 and 22 are tightly pressed together with their adjoining surfaces in intimate contact and are fixedly connected at spaced intervals by rivets 24. The cross-sectional shape of the conductor bar is generally similar to that of an I-beam with transversely extending longitudinal top and bottom pairs of oppositely projecting flanges. The bottom oppositely facing pair of flanges are designated 26 and 28. The member 20 serves as the part of the conductor engaged by the current collector, not shown, of the system, and the member 22 serves as a primarily current carrying part between the feeder connections to the conductor. The composite construction provides optimum strength and wearing characteristics with optimum current carrying capacity and required support at only widely spaced intervals and a minimum of feeder connections.

The adjoining ends of the individual conductor bars are mechanically and electrically connected together by splice plates 30, 32 at opposite sides of the conductor and overlapping the abutting ends of the adjoining conductor bar sections. The splice plates are bolted to the rail sections by bolts 34 and have inner inclined surfaces which conform to the configuration and inclination of the facing sides of the flange portions of the member 22. The construction is such that as the splice plates are bolted in place they wedge against or between the sides of the channels on opposite sides of the conductor bar sections formed by the upper and lower flange portions thereof.

Each of the supporting devices B for the conductor A comprise a plate or barlike member 40 fixed to the top of an insulator 42 as by a screw 44. The insulator 42 rests upon and is secured to a bracket 46 connected to a vertical supporting structure 48. It is to be understood, however, that the member 40 may be supported in any suitable manner. Each device B also comprises a pair of wheels or rollers 50 and 52 having circumferential grooves 54 and 56, respectively, within which the lower longitudinal flanges 26 and 28 of the conductor are received. The wheels or rollers 50, 52 are rotatably supported at opposite longitudinal sides of the conductor A by shouldered bolts 60 and 62, the threaded ends of which project through suitably spaced apertures 64 and 66 in the member 40 at opposite sides of the screw 44. The bolts 60 and 62 are fixed to the member 40 by nuts 70 and 72, respectively, threaded onto their projecting lower ends. The flanges 26 and 28 of the conductor A extend throughout the length thereof and project horizontally in the embodiment shown from opposite sides of the conductor.

As previously mentioned, the flanges 26, 28 of the conductor are received in the grooves 54, 56 of the wheels or rollers 50, 52, respectively, and are loosely confined therein by the upper and lower flanges of the rollers formed by the circumferential roller grooves 54, 56. The construction is such that the conductor is more or less loosely secured to the supporting devices and is capable of longitudinal movement therein. Provision of such movement is desired because of expansion and contraction of the bar due to changes in ambient temperature or the current carried by the conductor, as is well understood in the art. Attention is called to the fact that the lower outside portions of the splice plates 30 and 32 are cut away as at 74 and 76 to accommodate the upper flanges of the rollers thus allowing the splice plates to move through the supporting devices when necessary. As will be understood, the conductors are supported at spaced intervals throughout their length by supporting devices such as the device B and the construction immediately heretofore referred to allows the location of the supporting devices at any place throughout the length of the conductor.

The wheels or rollers 50, 52 are preferably made of a nonmetallic, noncorrosive material. The preferred material is a molded fiberglas. Any suitable material having the desired characteristics, and a low coefficient of friction, could be employed. Material such as hard pressed wood fiber board or a molded laminated phenolic with or without impregnated dry lubricant, Benelux, Nylon, Teflon, Micarata, Bakelite, etc. may be employed. Alternatively they may be made of suitable metal such as stainless steel or so-called self-lubricating bearing material.

From the foregoing description of the preferred embodiment of the invention shown in the drawings it will be apparent that the objects heretofore enumerated and others have been accomplished and that the support assembly disclosed may be employed to support the conductor in any position other than from below, as shown in the drawings. Adjoining conductors may be spaced relatively close together and any number of side-by-side conductors may be employed. It will also be apparent that the parts 40, 40', shown in the drawings, could be a single part extending underneath and supporting the four wheels or rollers shown. It will also be apparent that where more than two conductors are positioned side-by-side the parts 40 and 40' can be combined into a single part and extended to carry the wheels or rollers supporting the additional conductor or conductors as the case may be.

Having thus described my invention, what I claim is:

1. In an electric power distribution system for transmitting electric current to an apparatus movable along a trackway and having an electric current conductor extending lengthwise along the trackway comprising a plurality of rigid I-shaped conductor members providing oppositely projecting pairs of flanges along two sides of the conductor and connected end to end by pairs of splice plates having the outer portion of their sides adjacent to one pair of flanges along one side of the conductor cut away, an electric current collector carried by movable apparatus and slidable along the other side of the conductor, and insulator devices at spaced intervals along the trackway for supporting the conductor, said insulator device comprising a member adapted to be carried by a supporting structure adjacent said trackway, and circumferentially grooved electrically nonconductive, molded rollers located at opposite sides of the conductor rotatably carried by said member with their circumferential grooves in the same plane for receiving in the circumferential grooves of the rollers the outer end portions of one pair of oppositely projecting flanges of the conductor adjacent to the cutaway portions of the splice plates to thereby support the conductor for lengthwise movement relative to the supporting devices while restricting movement of the conductor transverse to its length.